United States Patent
Kato et al.

(10) Patent No.: US 6,510,614 B1
(45) Date of Patent: Jan. 28, 2003

(54) LINEAR GUIDE APPARATUS

(75) Inventors: Soichiro Kato, Maebashi (JP); Yoshinori Mizumura, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/669,398

(22) Filed: Sep. 22, 2000

(30) Foreign Application Priority Data

Sep. 29, 1999 (JP) ............................................. 11-276419

(51) Int. Cl.$^7$ .............................. G01B 7/02; G01B 11/02
(52) U.S. Cl. .......................................... 33/1 M; 33/706
(58) Field of Search ......................... 33/703, 705, 706, 33/707, 708

(56) References Cited

U.S. PATENT DOCUMENTS

| | | | | | |
|---|---|---|---|---|---|
| 4,663,853 | A | * | 5/1987 | Indo et al. ..................... | 33/707 |
| 5,250,126 | A | | 10/1993 | Ohya et al. | |
| 5,485,680 | A | * | 1/1996 | Nelle ........................... | 33/705 |
| 5,842,283 | A | * | 12/1998 | Yatsu et al. .................... | 33/706 |

FOREIGN PATENT DOCUMENTS

| | | | |
|---|---|---|---|
| DE | 883985 | A | 7/1953 |
| DE | 2156081 | A1 | 5/1972 |
| DE | 2616817 | C2 | 11/1977 |
| DE | 3331287 | A1 | 4/1984 |
| DE | 9402949 | U1 | 6/1994 |
| JP | 5-164128 | | 6/1993 |
| JP | 05164128 | A | 6/1993 |
| JP | 5-223122 | | 8/1993 |
| JP | 05223122 | A | 8/1993 |

OTHER PUBLICATIONS

Office Action mailed Sep. 1, 2001, in counterpart German Patent App. No. 100 48 359.3–12; includes full English translation.
Albert, M. and H. Kottritsch, *Walzlager Theorie und Praxis*, Springer–Verlag, Vienna, 1987.
Spur, G. and T. Stoferle, *Handbuch der Fertigungstechnik*, Carl Hanser Verlag, Munich, 1980.

* cited by examiner

Primary Examiner—Christopher W. Fulton
(74) Attorney, Agent, or Firm—Christensen O'Connor Johnson Kindness PLLC

(57) ABSTRACT

A linear guide apparatus comprises a rail and a bearing block movable in the longitudinal direction of the rail. The rail has a ground outside face. First raceway groove is formed on the outside face. Second raceway groove is formed on an inside face of the bearing block. A worked surface is formed by grinding on that portion of the inside face of the bearing block which is situated between the second raceway groove and a base portion. The worked surface and the outside face of the rail constitute a labyrinth seal portion, which serves to prevent foreign substances from getting into the raceway grooves. The worked surface and the second raceway groove of the bearing block are ground simultaneously.

13 Claims, 3 Drawing Sheets

LINEAR GUIDE APPARATUS

CROSS-REFERENCE TO RELATED APPLICATIONS

This application is based upon and claims the benefit of priority from the prior Japanese Patent Application No. 11-276419, Sep. 29, 1999, the entire contents of which are incorporated herein by reference.

BACKGROUND OF THE INVENTION

The present invention relates to a linear guide apparatus used in a head portion of an electronic component mounting machine, for example.

A linear guide apparatus is composed of a rail, bearing block, etc. A first raceway groove is formed on the outside face of the rail, while a second raceway groove is formed on the inside face of the bearing block. Rolling elements such as balls are held between the first and second raceway grooves. The rail and the bearing block can relatively move with smoothness with the aid of the rolling elements.

In the linear guide apparatus constructed in this manner, the bearing block is provided with a seal member such as an underseal, whereby dust or. other foreign substances are prevented from getting into the bearing block (onto the rolling contact surface of the rolling elements, in particular).

Seal means described in Jpn. Pat. Appln. KOKAI Publication No. 5-164128, for example, is provided with an underseal that is attached to the underside of a bearing block. A part of the underseal is sandwiched between the outside face of the rail and the inside face of the bearing block. In seal means described in Jpn. Pat. Appln. KOKAI Publication No. 5-223122, on the other hand, the outside face of a rail is formed having a groove that extends in the direction of movement of a bearing block. A part of a protector that is attached to the bearing block is fitted in the groove. Both these prior art examples use outside components, such as the underseal, protector, etc.

Thus fitted with the outside components, however, the conventional linear guide apparatus requires use of increased components and cannot be favorably reduced in size and weight. These days, in particular, there is an urgent demand for the reduction in size and weight of linear guide apparatuses, such as head portions of electronic component mounting machines, in order to shorten the mounting time. It is hard to meet the request for the small-sized lightweight apparatuses if outside components, such as an underseal, protector, etc., are attached to the bearing block or the like.

In order to reduce frictional force between the rail and the bearing block, it is not advisable to use an outside component, such as an underseal, which moves in contact with the rail. In some linear guide apparatuses that are used in a relatively clean working atmosphere, therefore, the bearing block is not provided with any outside component such as an underseal.

However, modern electronic components are becoming smaller and smaller or thinner. For example, a resistor-capacitor chip, the presently smallest chip, measures about 1.0 mm by 0.5 mm, and its thickness is reduced to about 0.3 mm. Chips measuring 0.6 mm by 0.3 mm and 0.2 mm thick are also being developed.

Even in a small-sized linear guide apparatus of the conventional type, the gap between the outside face of a rail and the inside face of a bearing block is 0.4 mm wide. If a conventional linear guide apparatus having no seal means is used in a head portion of a mounting machine that handles miniature components of the aforesaid type, therefore, foreign substances such as defective chips that are produced during mounting operation may possibly get into the gap between the rail and the bearing block. Foreign substances in the guide apparatus may damage or lock the bearing block. In consequence, the linear guide apparatus cannot fulfill its inherent durability and operating efficiency.

BRIEF SUMMARY OF THE INVENTION

Accordingly, the object of the present invention is to provide a linear guide apparatus capable of preventing foreign substances from getting into the gap between a rail and a bearing block without using any outside component such as an underseal.

In order to achieve the above object, a linear guide apparatus according to the present invention comprises a rail having a ground outside face with first raceway groove thereon and a bearing block having an inside face and a base portion and movable in the longitudinal direction of the rail, the inside face having thereon second raceway groove opposed individually to the first raceway groove of the rail, a worked surface formed by grinding on that portion of the inside face of the bearing block which is situated between the second raceway groove and the base portion, and a labyrinth seal portion formed of the worked surface and the outside face of the rail and serving to prevent foreign substances from getting into the first and second raceway grooves.

According to the present invention, the linear guide apparatus capable of preventing invasion of foreign substances without the use of any outside component, such as an underseal, can be provided at low cost. Using no outside component, the linear guide apparatus of the invention can be reduced in size. According to the linear guide apparatus of the invention, foreign substances such as defective chips can be prevented from being caught between the rail and the bearing block, in a head portion of an electronic component mounting machine, for example. Thus, the linear guide apparatus can fulfill its inherent durability and high functional characteristics.

Preferably, in this invention, the outside face and the first raceway groove of the rail are ground simultaneously, and the worked surface and the second raceway groove of the bearing block are ground simultaneously. According to this invention, the labyrinth seal portion formed between the rail and the bearing block can be controlled with higher accuracy.

In order to enhance the labyrinth seal effect, moreover, a projection extending in the longitudinal direction of the rail may be formed on the worked surface of the bearing block so that the gap between the rail and the distal end of the projection is partially narrowed. In this arrangement, a curtain, such as sealed lubricating grease, can be formed with ease. Alternatively, a projection extending in the longitudinal direction of the rail and its mating recess may be formed on the worked surface of the bearing block and in the outside face of the rail, respectively, to enhance the labyrinth seal effect further.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
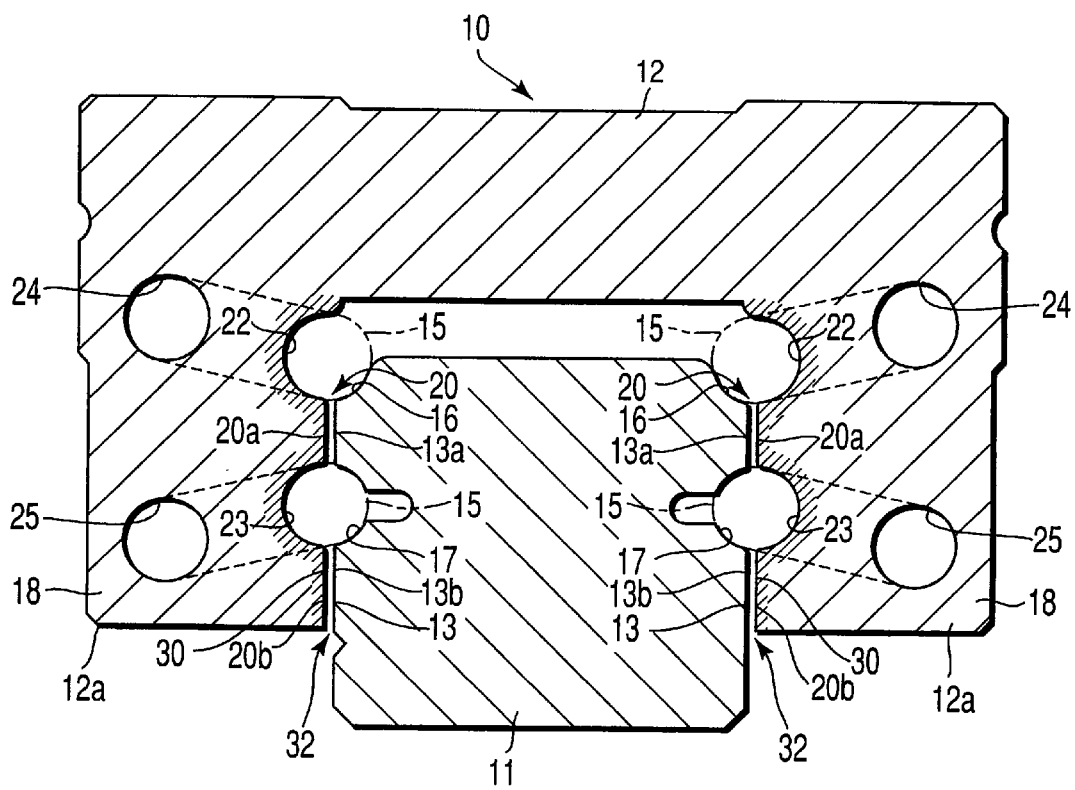
FIG. 1 is a cross-sectional view of a linear guide apparatus according to a first embodiment of the present invention.

A first embodiment of the present invention will now be described with reference to FIGS. 1 to 3. A linear guide apparatus 10 shown in FIG. 2 comprises a rail 11 and a bearing block 12 movable in the longitudinal direction of the rail 11. First raceway grooves 16 and 17, which hold balls 15 for use as rolling elements, are formed in a pair of outside faces 13, left and right, of the rail 11. The grooves 16 and 17, along with surfaces 13a and 13b of the outside faces 13 of the rail 11, are ground to a given surface accuracy by means of a grinding machine (not shown) with a grinding stone or the like in a manufacturing process for the rail 11. The bearing block 12 has a pair of arm portions 18, left and right, base portions 12a, etc.

Figure 2:
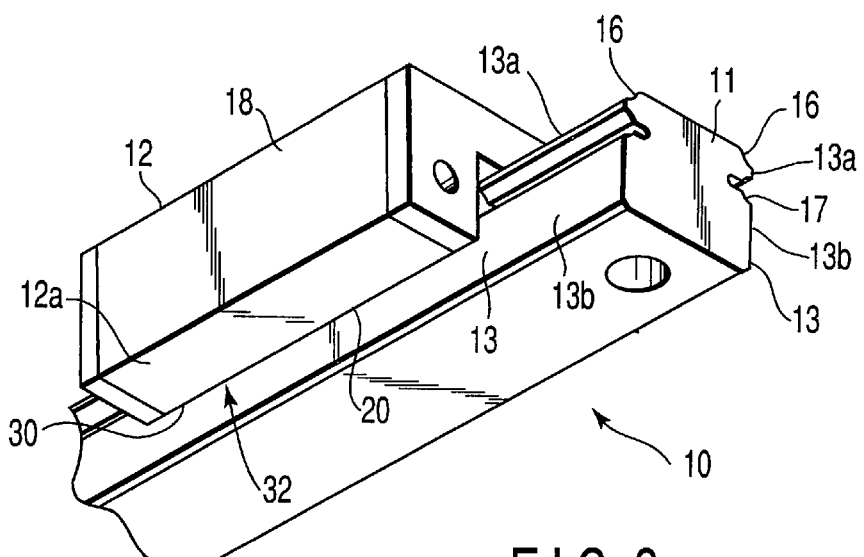
FIG. 2 is a partial perspective view of the linear guide apparatus shown in FIG. 1.

Corresponding individually to the raceway grooves 16 and 17 of the rail 11, as shown in FIG. 1, second raceway grooves 22 and 23 are formed in an inside face 20 of each arm portion 18 of the bearing block 12. Circuits are formed individually between the first raceway grooves 16 and 17 and their corresponding second raceway grooves 22 and 23. The balls 15 roll in the individual circuits. As the balls 15 infinitely circulate through return holes 24 and 25 in the bearing block 12, the block 12 can relatively move with smoothness in the longitudinal direction of the rail 11.

In the manufacturing process of the bearing block 12, the raceway grooves 22 and 23, along with surfaces 20a and 20b that constitute each inside face 20 of the block 12, are ground to a given surface accuracy by means of a grinding machine (not shown) with a formed grinding stone or the like. Thus, by this grinding operation, a worked surface 30 with a desired surface accuracy, which constitutes a labyrinth seal portion 32, is formed on each inside face 20 of the bearing block 12.

Both the surfaces 20a and 20b that constitute each inside face 20 may be ground simultaneously with the raceway grooves 22 and 23. Alternatively, only the surface 20b that is closer to each base portion 12a may be ground simultaneously with the grooves 22 and 23. Naturally, in this case, the surface 20a between the raceway grooves 22 and 23 are not ground simultaneously with the grooves 22 and 23.

The labyrinth seal portion 32 is formed between each outside face 13 of the rail 11 and the worked surface 30 near each base portion 12a of the bearing block 12. The seal portion 32 has a crevice G1 (shown in FIG. 3) that is narrow enough to prevent invasion of foreign substances. The crevice G1 should have a size smaller than the minimum size of foreign substances to be prevented from invasion, preferably half the minimum size or less.

In a head portion of an electronic component mounting machine, for example, foreign substances, such as defective chips of mismounted miniature electronic components, may possibly get into the gap between the rail 11 and the bearing block 12. It is advisable, therefore, to adjust the crevice G1 of each labyrinth seal portion 32 to 0.2 mm or less, which is smaller than a minimum dimension (e.g., thickness of 0.3 mm), out of the dimensions, i.e., height, width, and thickness, of a prevalent miniature electronic component. Preferably, the crevice G1 should be adjusted to 0.15 mm or less, which is substantially equal to half the minimum dimension, 0.3 mm, of the miniature electronic component.

To maintain the given crevice G1, the size of each ball 15 can be set beforehand according to the range of preload. Each labyrinth seal portion 32 is composed of the worked surface 30 of each arm portion 18 of the bearing block 12 and its corresponding outside face 13 of the rail 11. It is to be desired that the raceway grooves 22 and 23 and the inside faces 20 should be ground simultaneously in order to set the crevices G1 between the rail 11 and the worked surfaces 30 optionally and facilitate the manufacture.

Figure 3:
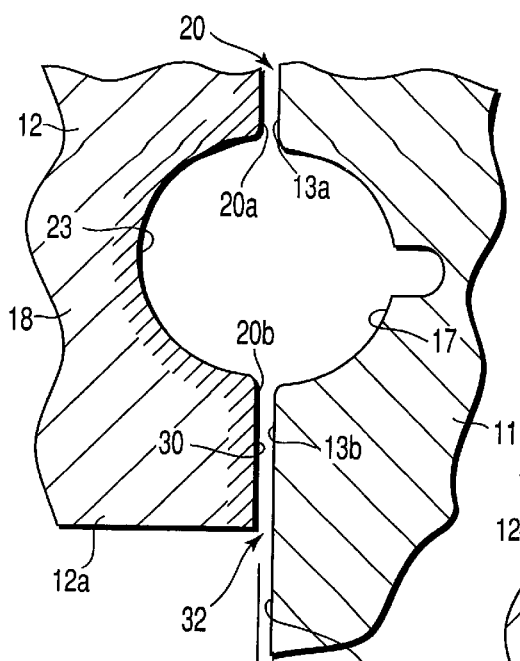
FIG. 3 is an enlarged partial sectional view of the linear guide apparatus shown in FIG. 1.

In the regions that are densely hatched in FIGS. 1 and 3, the raceway grooves 22 and 23 and the inside faces 20 are ground simultaneously. By this grinding, each crevice G1 between the inside face 20 of each arm portion 18 of the bearing block 12 and its corresponding outside face 13 of the rail 11 is adjusted to 0.2 mm or less, and preferably to 0.15 mm or less. Each labyrinth seal portion 32 for preventing penetration of foreign substances into the raceway grooves 16, 17, 22 and 23 is formed on the basis of the crevice G1. In the case of this embodiment, as shown in FIG. 3, the inside face 20 of each arm portion 18, which is ground together with the raceway grooves 22 and 23, has a flat shape.

If the linear guide apparatus 10, provided with the labyrinth seal portions 32, is used in the head portion of the electronic component mounting machine, for example, foreign substances, such as defective chips, cannot be caught between the rail 11 and the bearing block 12. Since the apparatus 10 does not require use of any conventional outside components, such as an underseal, protector, etc., the entire head portion including the bearing block 12 can be a lightweight compact structure.

Since the labyrinth seal portions 32 cause no substantial frictional resistance, moreover, the frictional resistance between the rail 11 and the bearing block 12 can be reduced. Thus, the head portion of the mounting machine having the bearing block 12 enjoys high operating efficiency and limited force of inertia, and is highly adaptive to the requirement for higher acceleration/deceleration performance.

Figure 4A:
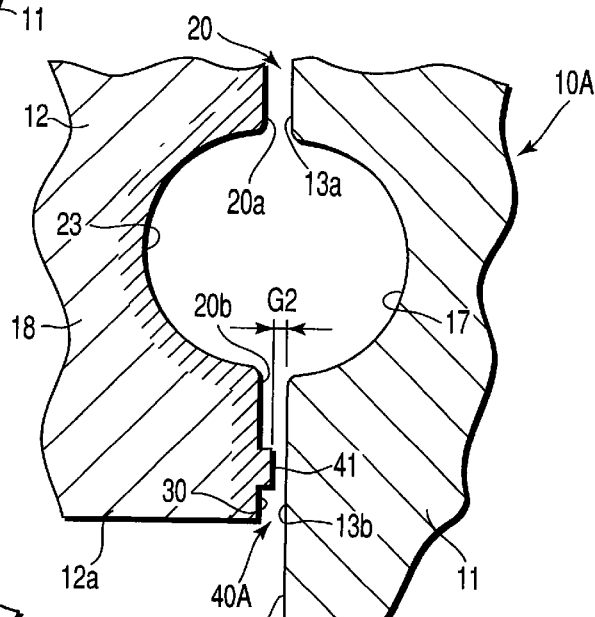
FIG. 4A is a partial sectional view of a linear guide apparatus according to a second embodiment of the invention.

FIG. 4A shows a labyrinth seal portion 40A of a linear guide apparatus 10A according to a second embodiment of the invention. In this labyrinth seal portion 40A, a projection 41 having a rectangular cross section is formed on a worked surface 30 of an. inside face 20 of a bearing block 12. The projection 41 extends in the direction of movement of the bearing block 12 (i.e., longitudinal direction of a rail 11). The labyrinth seal portion 40A having a crevice G2, narrow enough, is defined between the distal end of the projection 41 and the rail 11. As indicated by thick hatching in FIG. 4A, the worked surface 30 of the bearing block 12 and a raceway groove 23 are ground simultaneously.

Figure 4B:
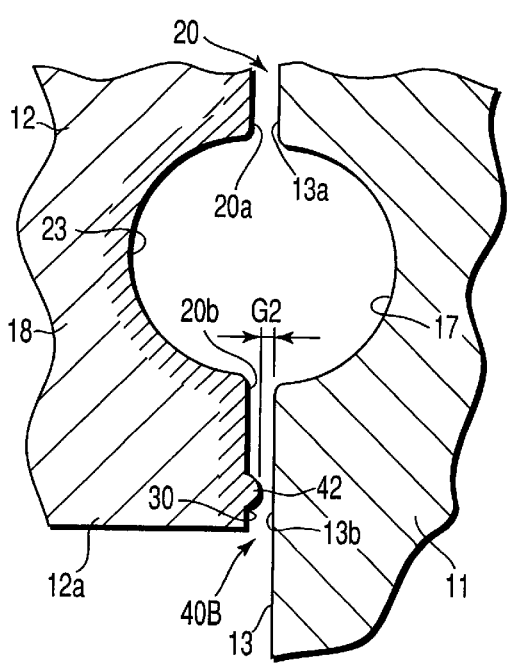
FIG. 4B is a partial sectional view of a linear guide apparatus according to a third embodiment of the invention.

FIG. 4B shows a labyrinth seal portion 40B of a linear guide apparatus lOB according to a third embodiment of the invention. In this labyrinth seal portion 40B, a projection 42 having an arcuate cross section is formed on a worked surface 30 of a bearing block 12. The projection 42 also extends in the direction of movement of the bearing block 12. The labyrinth seal portion 40B having a crevice G2, narrow enough, is defined between the distal end of the projection 42 and a rail 11. As indicated by thick hatching in FIG. 4B, the worked surface 30 of the bearing block 12 and a raceway groove 23 are ground simultaneously.

Figure 5:
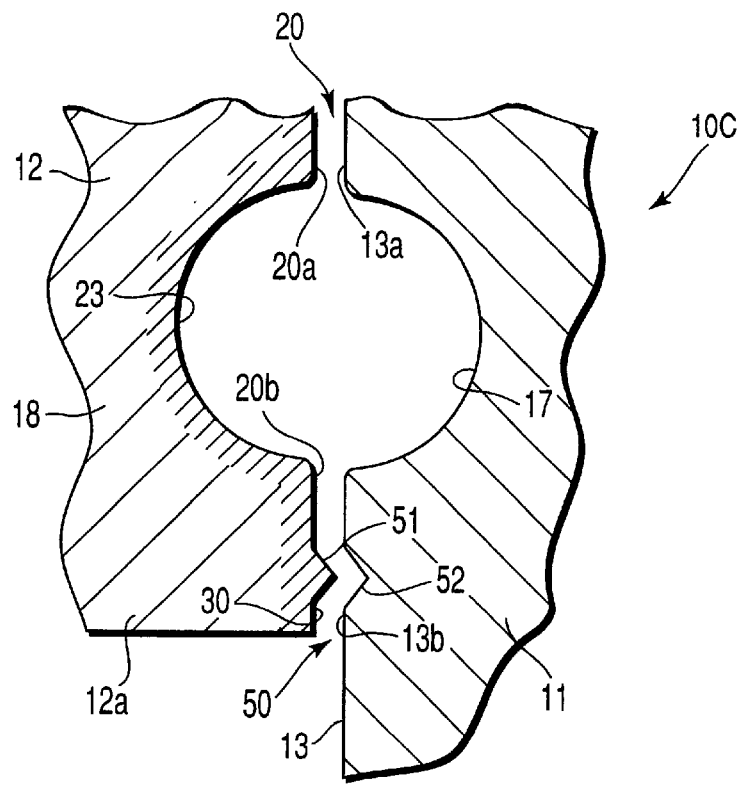
FIG. 5 is a partial sectional view of a linear guide apparatus according to a fourth embodiment of the invention.

FIG. 5 shows a labyrinth seal portion 50 of a linear guide apparatus 10C according to a fourth embodiment of the invention. In this labyrinth seal portion 50, a projection 51 is formed on a worked surface 30 of a bearing block 12. A rail 11 is formed having a recess 52 that mates with the projection 51. Both the projection 51 and the recess 52 extend in the longitudinal direction of the rail 11 or the direction of movement of the bearing block 12. According to the embodiment shown in FIG. 5, the cross section of the projection 51 is triangular or angled. Alternatively, however, the cross section of the projection 51, like that of the projection 41 or 42 of the second or third embodiment, may be rectangular or arcuate. As indicated by thick hatching in FIG. 4B, the worked surface 30 of the bearing block 12 and a raceway groove 23 are ground simultaneously.

In the labyrinth seal portion 50, the projection 51 is fitted in the recess 52. If the bearing block 12 is broken to cause balls therein to slip out of the raceway groove 23, in this arrangement, the block 12 can be prevented from vertically falling off the rail 11. Thus, falling of the bearing block 12 can be effectively prevented in the case of the linear guide apparatus in which the block 12 located under the rail 11.

Figure 6:
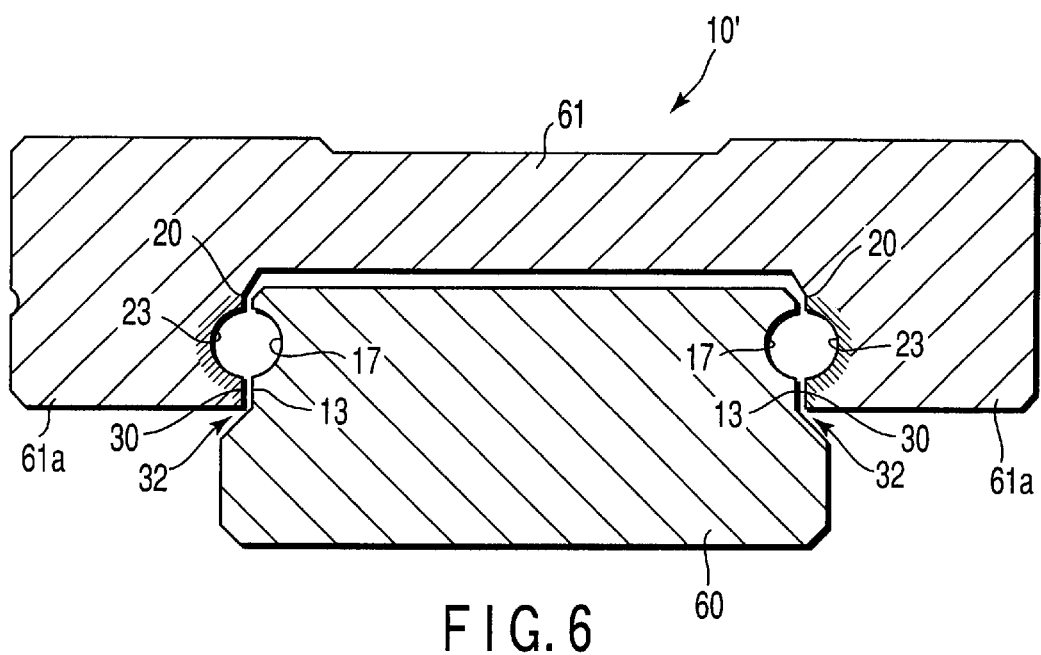
FIG. 6 is a cross-sectional view of a linear guide apparatus according to a fifth embodiment of the invention.

FIG. 6 shows a linear guide apparatus 10' according to a fifth embodiment of the invention. A first raceway groove 17 is formed on each side of a rail 60, while a second raceway groove 23 is formed in each inside face 20 of a bearing block 61. As indicated by thick hatching in FIG. 6, the raceway groove 23, a worked surface 30, etc. are ground simultaneously. Thus, at least that portion of each inside face 20 of the bearing block 61 which is located between the raceway groove 23 and a base portion 61a is ground simultaneously with the raceway groove 23. The worked surface 30 and each outside face 13 of the rail 60 constitute a labyrinth seal portion 32.

It is to be understood that several components of the present invention, including the raceway grooves, the worked surfaces of the labyrinth seal portions, etc., as well as the rail and the bearing block, may be changed or modified various without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A linear guide apparatus comprising:
   a rail having an outside face with first raceway grove thereon,
   a bearing block having an inside face and a base portion and movable in the longitudinal direction of the rail, the inside face having thereon second raceway grove opposed individually to the first raceway groove of the rail;
   a worked surface formed on that portion of the inside face of the bearing block which is situated between the second raceway grove and the base portion, wherein the worked surface is spaced from the outside face so that the worked surface does not come into contact with the outside face; and
   a labyrinth seal portion formed of the worked surface and the outside face of the rail and serving to prevent foreign substances from getting into the first and second raceway grooves wherein the labyrinth seal portion comprises a gap formed between the worked surface and the outside face, said gap being approximately 0.2 mm or less wide.

2. The linear guide apparatus of claim 1, wherein the gap formed between the worked surface and the outside face is approximately 0.15 mm or less wide.

3. The linear guide apparatus of claim 1, wherein the worked surface is substantially flat.

4. The linear guide apparatus of claim 1, wherein the outside face of the rail is formed by grinding.

5. The linear guide apparatus of claim 1, wherein the worked surface is formed by grinding.

6. The linear guide apparatus of claim 1, wherein at least one ball is positioned within the first and second raceway grooves and the width of the gap is determined by the size of the at least one ball.

7. A linear guide apparatus comprising:
   a rail having an outside face with first raceway groove thereon;
   a bearing block having an inside face and a base portion and movable in the longitudinal direction of the rail, the inside face having thereon second raceway grove opposed to the first raceway groove of the rail;
   a worked surface formed on that portion of the inside face of the bearing block which is situated between the second raceway groove and the base portion, wherein the worked surface is spaced from the outside face so that the worked surface does not come into contact with the outside face, and
   a labyrinth seal portion serving to prevent foreign substances from getting into the first and second raceway grooves, the labyrinth seal portion comprising a projection formed on the worked surface, and a gap formed between the projection and a portion of the outside face.

8. The linear guide apparatus of claim 7, wherein the gap formed between the projection and the portion of the outside face is approximately 0.2 mm or less wide.

9. The linear guide apparatus of claim 7, wherein the portion of the outside face comprises a recess adjacent to the projection.

10. A linear guide apparatus comprising:
    a rail having an outside face with first raceway groove thereon;
    a bearing block having an inside face and a base portion and movable in the longitudinal direction of the rail, the inside face having thereon second raceway groove opposed to the first raceway groove of the rail, a worked surface formed on that portion of the inside face of the bearing block which is situated between the second raceway groove and the base portion, wherein the worked surface is spaced from the outside face so that the worked surface does not come into contact with the outside face; and a labyrinth seal portion serving to prevent foreign substances from getting into the first and second raceway grooves, the labyrinth seal portion comprising a recess formed in a portion of the outside face of the rail, a projection formed on the worked surface that extends into the recess, and a gap formed between the projection and the recess.

11. The linear guide apparatus of claim 10, wherein the gap is approximately 0.2 mm or less in width.

12. The linear guide apparatus of claim 10, wherein the width of the gap is adjustable.

13. The linear guide apparatus of claim 12, wherein the width of the gap is adjusted by placing a plurality of balls of a predetermined size into the first and second raceway grooves.

* * * * *

UNITED STATES PATENT AND TRADEMARK OFFICE
CERTIFICATE OF CORRECTION

PATENT NO.   : 6,510,614 B1
DATED        : January 28, 2003
INVENTOR(S)  : S. Kato et al.

It is certified that error appears in the above-identified patent and that said Letters Patent is hereby corrected as shown below:

<u>Column 6,</u>
Lines 3, 7, 13 and 42, "grove" should read -- groove --
Line 4, "thereon," should read -- thereon; --
Line 49, "face, and" should read -- face; and --

<u>Column 7,</u>
Line 2, "rail," should read -- rail; --

Signed and Sealed this

Seventeenth Day of June, 2003

JAMES E. ROGAN
*Director of the United States Patent and Trademark Office*